United States Patent [19]

Thometzek et al.

[11] Patent Number: 5,393,714
[45] Date of Patent: Feb. 28, 1995

[54] FREE-FLOWING, CHEMICALLY RESISTANT COLOR GRANULATES, THEIR PREPARATION AND USE

[75] Inventors: Peter Thometzek, Florano Modenese; Heinrich Christ, Spilamberto, both of Italy

[73] Assignee: Ferro Italia S.r.l., Bologna, Italy

[21] Appl. No.: 174,305

[22] Filed: Dec. 29, 1993

[30] Foreign Application Priority Data

Dec. 30, 1992 [IT] Italy .................... MI92A002995

[51] Int. Cl.⁶ .................... C03C 1/04; C03C 6/08
[52] U.S. Cl. ........................ 501/29; 501/17; 501/21; 501/26; 106/489
[58] Field of Search .............. 106/489, 287.16; 501/17, 20, 21, 26, 29

[56] References Cited

U.S. PATENT DOCUMENTS

| | | | |
|---|---|---|---|
| 3,443,973 | 5/1969 | Bugosh et al. | 501/17 |
| 3,527,649 | 9/1970 | Sullivan | 501/17 |
| 3,928,668 | 12/1975 | Snow | 427/14 |
| 4,039,697 | 8/1977 | Isawa et al. | 427/27 |
| 4,,128,438 | 12/1978 | Wolff et al. | 106/287.16 X |
| 4,659,586 | 4/1987 | Schittenhelm et al. | 427/27 |
| 4,818,294 | 4/1989 | Rayathatha et al. | 106/287.16 X |
| 5,275,978 | 1/1994 | Shibuya et al. | 501/17 X |

FOREIGN PATENT DOCUMENTS 0074779  3/1983  European Pat. Off. .
4007037  9/1991  Germany .

Primary Examiner—Karl Group
Attorney, Agent, or Firm—Rankin, Hill, Lewis & Clark

[57] ABSTRACT

The present invention provides free-flowing chemically resistant color granulates that are heat resistant and color stable in aggressive media. The color granulates comprise 20–94.8% by weight coloring bodies, 5–75% by weight of one or more frits, 0.220% by weight binder and 0.03–15% by weight organosilanes and/or polyorganosiloxanes. The glass frit comprises by weight 20–90% $SiO_2 + B_2O_3 + Al_2O_3$, 0–6% $Na_2O + Li_2O$, 0–6% $K_2O$, 10–25% $CaO + MgO + SrO$, 0–35% $TiO_2 + ZrO_2$, 0–40% $Bi_2O_3 + P_2O_5 + V_2O_5 + MoC_3 + WO_3$ and 0–10% ZnO.

5 Claims, No Drawings

FREE-FLOWING, CHEMICALLY RESISTANT COLOR GRANULATES, THEIR PREPARATION AND USE

BACKGROUND OF THE INVENTION

The invention relates to free-flowing, chemically resistant colour granulates which are manufactured by build-up granulation, and their use.

Many pigments and inorganic colouring bodies which are used for colouring ceramics, enamels, glass, synthetic materials and so on, exhibit only a limited thermal or chemical stability. For example, enamel molten masses during processing are especially aggressive to inorganic colouring bodies because of their high $B_2O_3$ or alkali contents. This brings, in the processing of many pigments in enamels to undesired colour shift or to the complete dissolution of the pigment particles having usually a size of about 0.2 to 0.7 microns.

Some colouring bodies are actually rather stable in enamel or ceramic molten masses, but contain environmentally questionable elements, such as lead, cadmium, five-valent antimony, six-valent chromium and so on.

This has consequences onto the disposal of coloured objects. A limited number of colouring bodies can be stabilized in the form of inclosure pigments (see EP-A 74.779). The manufacturing process for this kind of pigment is very complicated and expensive.

Coloured pigments based on metal oxide-coated platelet-like substrates, wherein the coating contains at least 10 wt. % $Al_2O_3$ are also known (DE-A 4,007,037). $Al_2O_3$ reduces the colour strength and gloss of the coloured pigment. The pigment not being coloured in depth, in case of a chemical attack the coloured surface layer is preferably dissolved.

Also the stabilization of colouring bodies in molten corundum is known (JA 78/128600). Owing to the production in the electric arc oven at high temperature, only a very limited colour spectrum can be produced. The manufacture—especially the micronization—of this product is complicated and expensive.

Up to now, it was however not possible to provide a wide palette of colours for incorporation in aggressive mediums, such as enamels, without resorting to heavy metal-containing pigments.

The task was therefore to provide chemically resistant, free-flowing colouring body having a high colour strength and brightness containing no questionable heavy metals.

This task could surprisingly be accomplished by means of the coloured granulates according to the invention.

SUMMARY OF THE INVENTION

The object of the invention are free-flowing chemically resistant colour granulates that are heat resistant and colour stable in aggressive media and contain no questionable heavy metals, characterized in that they contain 20–94.8 wt. % of one or several inorganic colouring bodies and/or pigments
5–75 wt. % of one or several frits and/or glasses
0.2–20 wt. % of one or several inorganic and/or organic binders,
said colour granulates having an average grain size of from 5 to 25 microns, preferably from 5 to 12 microns.

DETAILED DESCRIPTION OF THE INVENTION

As the inorganic colouring bodies or pigments, pure oxides or mixed phases oxide are preferably employed. Illustratively of the pigment based on an oxide, iron oxide, titanium oxide, tin oxide and cerium oxide can be mentioned. The mixed phase oxides are based on two or more element oxides, said elements being for example iron, cobalt, vanadium, tungsten, manganese, copper, chromium, aluminium, silicon, zirconium, titanium, tin and zinc.

More preferable colouring bodies are based on zirconium/praseodymium/silicon oxide, zirconium/vanadium oxide, tin/vanadium-oxide, cobalt/aluminium-oxide, cobalt/silicon-oxide, cobalt/aluminium/tungsten-oxide, zirconium/vanadium-oxide, zinc/cobalt/aluminium-oxide, zirconium/iron/silicon-oxide, chromium/tin-oxide and chromium/aluminium-oxide.

Also sulfides, such as cerium sulfide and lanthanum sulfide, are used as the colouring body.

The colouring bodies and/or pigments are contained in the granulate in an amount of from 20 to 94.8 wt. %, preferably from 25 to 80 wt. %

As the organic binders temporary binders such as starch and dextrin glues, cellulose ethers, such as methylcellulose or carboxymethylcellulose, binders based on polysaccharides, bonding agents based on polyvinyl acetates, polyacrylates, polyvinyl alcohols, dispersion adhesives on synthetic resin or rubber basis, one- or two-component polycondensation adhesives and polyethers or polywaxes and so on in solution or suspension or possibly in emulsion are preferably employed.

At the inorganic binders, sodium silicate, potassium silicate, aluminium phosphate, especially monoaluminium monophosphate, phosphoric acid, sodium aluminium phosphate, sodium aluminate, boron phosphate, aluminium silicate, sodium calcium silicate, potassium calcium silicate, silicon phosphate, silica sol and $Al(OH)_3$ sol and so on are preferably employed.

Either one or a suitable combination of these binders is contained in the granulate in an amount of from 0.2 to 20 wt. %, preferably 0.5 to 10 wt. %, referred to the solids contents.

For the preparation of hydrophobic granulate, additionally to or instead of the inorganic and/or organic binders one or more organosilanes and/or polyorganosiloxanes in an amount of from 0.03 to 15 wt. %, preferably 0.1 to 6 wt. %, the total amount of binder/organosilane and/or polyorganosiloxane being not lower than 0.2 wt. % and up to 20 wt. % are used as binders.

The colour granulates contain moreover 5 to 75 wt. %, preferably 20 to 60 wt. %, of one or more frits and/or glasses. By suitably selecting the frit composition or the temperature-viscosity characteristic of the frit, the chemical stability and brightness of the colour can be enhanced. Frits with the following composition are preferably employed:

$SiO_2+B_2O_3+Al_2O_3$ 20–90 wt. %
$Na_2O+Li_2O$ 0–6 wt. %
$K_2O$ 0–6 wt. %
$CaO+MgO+SrO$ 10–25 wt. %
$TiO_2+ZrO_2$ 0–35 wt. %
$Bi_2O_3+P_2O_5+V_2O_5+MoO_3+WO_3$ 0–40 wt. %
$ZnO$ 0–10 wt. %
with a $B_2O_3$ content of lower than 25 wt. %, preferably lower than 5 wt. %.

The employed frits are preferably high brightness transparent frits with a high refractive index of greater than 1.5, more preferably greater than 1.6. By selecting suitable frits, the hue that is obtained upon incorporation with the granulate according to the invention can be modified or optimized within certain limits. Obviously also colour granulate with no frit content can be produced. This would however impair chemical stability in aggressive molten masses.

For incorporation in certain media such as synthetic materials or rubber, or for certain application techniques, such as the dry application in the electrostatic field onto objects or ceramic substrates for enamel coating, hydrophobic colour granulates are employed which contain 0.03 to 15 wt. %, preferably 0.1 to 8 wt. %, of one or more hydrophobic organosilanes and/or polyorganosiloxanes additionally to or instead of the inorganic binders, the total amount of binder/organosilane and/or polyorganosiloxane being not lower than 0.2 wt. % and not higher than 20 wt. %.

The colour granulates according to the invention have an average particle size of from 5 to 25 microns, preferably 5 to 12 microns, i.e. they exhibit a particle size of one to two ten-base powers higher as compared with the colouring body. Said particle size gives rise to a further stability improvement upon firing in glazings or enamels.

By mixing the granulates according to the invention, which are preferably in the fundamental colours yellow, blue and red, almost the whole colour spectrum can be obtained, possibly with white and black additionally.

Contrarily to the colouring bodies, with the granulates purer, brighter colour hues are surprisingly obtained. The hue shift to dirty colour hues which is usually observed upon mixing pigments is not observed with the colour granulates. Thus, for example, by mixing the yellow and red granulates according to the invention (for example Zr-Pr-Si-O yellow with Cr-Sn-O red) a more intense, purer orange hue is obtained. Upon mixing of the pure pigments, the observed colour impression is shifted on the contrary to brown.

A further object of the invention is the preparation of the colour granulate according to the invention, which is characterized in that the granulate components, excluding the binder(s), are brought to a particle size of smaller than 10 microns, preferably smaller than 5 microns followed by intimately mixing in a granulation unit, such as a mixing device, a forced circulation mixer, a granulation pan or a fluid bed granulator and by granulation with one or more inorganic and/or organic binders in an amount of from 0.2 to 20 wt. %, preferably 0.5 to 10 wt. %, as referred to the solids contents, possibly with the addition of water or other suitable liquids (dispersion aids), such as alcohols, and are then annealed at a temperature of from 120° to 1200° C., preferably from 150° to 350° C., for a period of up to 24 hours, and possibly screened.

The granulate components are milled before granulation for example in ball mills in the dry or preferably wet milling process, in counter current fluid energy mills, vapor jet mills, pearl mills, annular slit mills, roller mills or impact mills.

Coarse granules of larger than 40 microns can be sieved or screened off thereafter. The binder amount and binder concentration are adjusted so that after granulation and annealing an abrasion resistant product with the desired average particle size of from 5 to 25 microns is obtained. A drying or annealing treatment at between 120° C. and 1200° C., preferably at 150° to 350° C., is helpful to increase the hardness of the granulate particles. Thereafter a sieving or screening can be performed to remove the coarse granules.

When producing hydrophobic colour granulates, organosilanes and/or polyorganosiloxanes are preferably employed as the hydrophobixing agent, for example in water emulsion. Thus the dust particles can be uniformly wetted with the emulsified polyorganosiloxane droplets. Upon the successive heat treatment, a hydrophobic built-up granulate is obtained. At the organosilanes, silanols such as trimethylsilanol are for example employed. The employed polyorganosiloxanes are for example trimethylsilylpolydimethylsiloxanes, which can possibly also contain methylphenyl or diphenylsiloxy groups or methylhydrogensiloxyl groups. The water emulsions of the polyorganosiloxanes are preferably added during granulation together with a further binder. The addition of the emulsion can be carried out towards the end of the granulation process, in which case in the beginning stage the granulate components are wetted and agglomerated with one or more temporary or permanent binders.

A further object of the invention is the preparation of the colour granulate according to the invention, which is characterized in that the granulate components, excluding the binder(s), are brought to a particle size of smaller than 10 microns, preferably smaller than 5 microns, followed by mixing with one or more inorganic and/or organic binders in an amount of from 0.2 to 20 wt. %, preferably 0.5 to 10 wt. %, as referred to the solids contents, possibly with the addition of water and/or a dispersion aid, the suspension thus obtained is spray-dried in a spraying tower to possibly spherical granules and the granules, optionally, are then annealed at a temperature of from 120° to 1200° C., preferably from 150° to 350° C., for a period of up to 24 hours, and possibly screened.

The production of the colour granulates can also be carried out in a fluid bed drier, a drum drier or a hot gas reactor, preferably with strongly turbulent flow (Turbulator manufactured by Maurer, or reaction chamber by Babcock).

Contrarily to inorganic colouring bodies or pigments, the colour granulates according to the invention show no tendency to dusting. Moreover, they are very highly flowable and therefore can be more easily processed.

The granulate components being firmly fixed in the granulate particles, during further processing, no segregation can occur.

The free-flowing, chemically resistant colour granulates are employed for colouring enamels, glazings, ceramic layers, glasses and so on, thereby providing stable, bright colours with high hiding power.

The colour granulates according to the invention can be incorporated in said media or used for the surface decoration of said substrates.

The colour granulates according to the invention are also employed in the hydrophobic form for colouring synthetic materials, synthetic resins, rubber, paints, laminates, printing inks and coloured inks, and so on.

By properly mixing at least two coloured granulates according to the invention, most of the colour hues can be obtained without heavy metals, such as chromium, cadmium, lead, five-valent antimony and so on. Up to now, many colour hues could only be obtained with these heavy metals as the colouring bodies, or the colouring bodies were not chemically resistant.

The invention will now be explained in greater detail by means of the following examples.

EXAMPLE 1

In a forced circulation mixer manufactured by Eirich, Hardhelm, the following starting products are introduced:

1.3 kg of a blue colouring body based on aluminium and cobalt oxides (commercially available product No. FS 641 from Bayer AG, Leverkusen) and 0.6 kg of a ceramic frit having the following composition in weight percent $SiO_2$ 58,1
$B_2O_3$ 3,7
$Al_2O_3$ 11,1
$Na_2O$ 0,3
$K_2O$ 4,1
MgO 1,6
CaO 15,1
$ZrO_2$ 0,2
$P_2O_5$ 0,2
ZnO 5,6

The frit is first brought to an average particle size of 4 microns by wet milling in a porcelain ball mill, followed by drying and pulverization. The particle size determination is carried out by means of a particle size measuring instrument manufactured by Malvern, Worcestershire.

After intensive homogenization in the forced circulation mixer, 250 g of an aqueous solution containing 32% of potassium silicate are added in small portions.

After an intensive mixing process, the fine particle granulate obtained is annealed for 2 hours at 250° C. in a drying oven. After sieving off the coarse particles of larger than 40 microns, the obtained colour granulate has an average particle size of 11 microns.

5 wt. % of the colour granulate is incorporated in a transparent enamel frit (commercially available product No. TR 2500, Bayer AG, Leverkusen).

After coating onto an enamel-primed plate and firing at 820° C. for 4 minutes, a deep blue enamel coating is obtained which exhibits high gloss and hiding power.

EXAMPLE 2

The same procedures as in example 1 are repeated, except that instead of the Co-Al-O colouring body a yellow colouring body of the System Zr-Si-Pr-O (commercially available product No. FZ 347, from Bayer AG, Leverkusen) is employed.

After incorporating 5 wt. % of the colour granulate in a transparent enamel (see example 1), a yellow enamel coating is obtained which exhibits high gloss, hiding power and colour intensity.

EXAMPLE 3

The same procedures of example 1 are repeated, except that a red colouring body of the system Zr-Si-Fe-O (commercially available product No. FZ 805, from Bayer AG, Leverkusen) is employed.

After incorporating 5 wt. % of the colour granulate in a transparent enamel (see example 1), a red enamel coating is obtained which exhibits high gloss.

EXAMPLE 4

3.8 wt. % of the yellow colour granulate of example 1 are incorporated together with 1.2 wt. % of the blue-coloured granulate of example 1 in the transparent enamel frit (see example 1). There is obtained a dark green enamel with high gloss and hiding power.

EXAMPLE 5

3.8 wt. % of the yellow colouring body of example 1 are incorporated together with 1.2 wt. % of the blue colouring body of example 1 in the transparent enamel frit (see example 1). There is obtained a weak, dirty green, inhomogeneous colouring of poor hiding power. The yellow colouring body was intensively dissolved by the aggressive enamel molten mass.

EXAMPLE 6

4 wt. % of the red colour granulate of example 3 are incorporated together with 1 wt. % of the blue colour granulate of example 1 in the transparent enamel frit (see example 1). There is obtained a wine red enamel with high gloss and hiding power.

EXAMPLE 7

4 wt. % of the red colouring body of example 3 are incorporated together with 1 wt. % of the blue colouring body of example 1 in the transparent enamel frit (see example 1). There is obtained the weak red, inhomogeneous enamel coating essentially devoid of any hiding power.

EXAMPLE 8

The same procedures as used in example 1 are repeated, except that for the granulation, after the addition of the potassium silicate solution, also 20 g of an aqueous 50% polysiloxane emulsion (Baysilon AC 3454, a commercial product from Bayer AG, Leverkusen) are added. After annealing at 200° C., a blue hydrophobic granulate is obtained with excellent flowing characteristics.

5 wt. % of the hydrophobic colour granulate are mixed with 95 wt. % of a Puesta-Pulver (a commercially available product, No. TR 2500 P, Bayer AG, Leverkusen), consisting of the transparent enamel frit and a hydrophobizing agent, followed by application under 50 KV onto an enamelled plate. After firing, a deep blue, homogeneous enamel coating is obtained which exhibits high hiding power and gloss. No segregation of the frit from the coloured granulate is observed.

It is claimed:

1. Free-flowing chemically resistant color granulates that are heat resistant and color stable in an aggressive media, said color granulates comprising:
   20–94.8% by weight of at least one coloring body;
   0.03–15% by weight of a silicon material selected from the group consisting of organosilanes, polyorganosiloxanes and mixtures thereof;
   5–75% by weight of at least one frit;
   0.2–20% by weight of at least one binder selected from the group consisting of an inorganic binder, an organic binder and mixtures thereof;
   said frit comprising in weight percent:
   $SiO_2+B_2O_3+Al_2O_3$ 20–90 wt. %
   $Na_2O+Li_2O$ 0–6 wt. %
   $K_2O$ 0–6 wt. %
   $CaO+MgO+SrO$ 10–25 wt. %
   $TiO_2+ZrO_2$ 0–35 wt. %
   $Bi_2O_3+P_2O_5+V_2O_5+MoO_3+WO_3$ 0–40 wt. %
   ZnO 0–10 wt. % said color granulates having an average grain size of from 5 to 25 microns.

2. The color granulates of claim 1 wherein said coloring body comprises a yellow coloring body selected from the group consisting of zirconium/praseodymium/silicon-oxide yellow, zirconium/vanadium-oxide yellow and tin/vanadium-oxide yellow.

3. The color granulates of claim 1 wherein said coloring body comprises a blue coloring body selected from the group consisting of cobalt-oxide blue, cobalt/aluminum-oxide blue, cobalt/aluminum tungsten-oxide blue, cobalt/silicon-oxide blue, zirconium/vanadium-oxide blue and zinc/cobalt/aluminum-oxide blue.

4. The color granulates of claim 1 wherein said coloring body comprises a red coloring body selected from the group consisting of zirconium/iron/silicon-oxide red, iron oxide red, chromium/tin-oxide red and chromium/aluminum-oxide red.

5. The color granulates of claim 1 wherein said coloring body comprises a pigment.

* * * * *